(12) United States Patent
Tian

(10) Patent No.: US 11,425,057 B2
(45) Date of Patent: Aug. 23, 2022

(54) PACKET PROCESSING

(71) Applicant: New H3C Technologies Co., Ltd., Hangzhou (CN)

(72) Inventor: Hao Tian, Beijing (CN)

(73) Assignee: New H3C Technologies Co., Ltd., Zhejiang (CN)

( * ) Notice: Subject to any disclaimer, the term of this patent is extended or adjusted under 35 U.S.C. 154(b) by 338 days.

(21) Appl. No.: 16/635,529

(22) PCT Filed: Jul. 26, 2018

(86) PCT No.: PCT/CN2018/097254
§ 371 (c)(1),
(2) Date: Jan. 30, 2020

(87) PCT Pub. No.: WO2019/024763
PCT Pub. Date: Feb. 7, 2019

(65) Prior Publication Data
US 2020/0259766 A1  Aug. 13, 2020

(30) Foreign Application Priority Data
Jul. 31, 2017  (CN) .......................... 201710638401.3

(51) Int. Cl.
*H04L 49/90* (2022.01)
*G06F 3/06* (2006.01)
(Continued)

(52) U.S. Cl.
CPC .......... *H04L 49/9042* (2013.01); *G06F 3/061* (2013.01); *G06F 3/064* (2013.01);
(Continued)

(58) Field of Classification Search
CPC ... H04L 49/9042; H04L 49/901; H04L 69/22; G06F 3/061; G06F 3/064; G06F 3/067; G06F 9/5016
See application file for complete search history.

(56) References Cited

U.S. PATENT DOCUMENTS 7,411,968 B2  8/2008  Chong et al.
8,542,693 B2  9/2013  Soni et al.
(Continued)

FOREIGN PATENT DOCUMENTS

CN  101621469 A  1/2010
CN  105099948 A  11/2015
(Continued)

OTHER PUBLICATIONS

Japanese Patent Office Action, Office Action Issued in Application No. 2020-505176, dated Sep. 14, 2021, 6 pages. (Submitted with Machine Translation).
(Continued)

*Primary Examiner* — Samina F Choudhry
(74) *Attorney, Agent, or Firm* — McCoy Russell LLP

(57) ABSTRACT

A memory of a network device is divided into first blocks, each first block being divided into second blocks, and each second block including a first storage space and second storage space. When a packet is stored, second blocks occupied by the packet are determined based on a packet length and a first storage space length, and the packet is stored into a first storage space of each of the second blocks. For each of the second blocks, a PD corresponding to the second block is generated, and stored into a second storage space of the second block. When a packet is read, the second blocks to be read are determined based on a start address of the packet. A packet fragment is read from a first storage (Continued)

space of the second blocks to be read, and the read packet segments are composed into the second packet to be sent.

13 Claims, 7 Drawing Sheets

(51) Int. Cl.
*H04L 49/901* (2022.01)
*H04L 69/22* (2022.01)
*G06F 9/50* (2006.01)

(52) U.S. Cl.
CPC ............ *G06F 3/067* (2013.01); *H04L 49/901* (2013.01); *H04L 69/22* (2013.01); *G06F 9/5016* (2013.01)

(56) References Cited

U.S. PATENT DOCUMENTS

| | | | |
|---|---|---|---|
| 9,990,307 B1* | 6/2018 | Patel | .................. G06F 13/30 |
| 2002/0188742 A1 | 12/2002 | Nie | |
| 2007/0223483 A1 | 9/2007 | Huang et al. | |
| 2011/0040923 A1 | 2/2011 | Ren | |
| 2015/0095439 A1 | 4/2015 | Jorgensen et al. | |
| 2017/0147251 A1 | 5/2017 | Lu et al. | |

FOREIGN PATENT DOCUMENTS

| | | |
|---|---|---|
| JP | H024067 A | 1/1990 |
| JP | 2002261840 A | 9/2002 |
| JP | 2003174475 A | 6/2003 |
| JP | 2013135382 A | 7/2013 |
| WO | 2004066571 A1 | 8/2004 |
| WO | 2016078212 A1 | 5/2016 |

OTHER PUBLICATIONS

ISA State Intellectual Property Office of the People's Republic of China, International Search Report Issued in Application No. PCT/CN2018/097254, dated Oct. 24, 2018, WIPO, 4 pages.
State Intellectual Property Office of the People's Republic of China, Office Action and Search Report Issued in Application No. 201710638401.3, dated Mar. 6, 2019,10 pages. (Submitted with Partial Translation).
ISA State Intellectual Property Office of the People's Republic of China, Written Opinion of the International Searching Authority Issued in Application No. PCT/CN2018/097254, dated Oct. 24, 2018, WIPO, 8 pages.
European Patent Office, Extended European Search Report Issued in Application No. 18840257.2, dated Jun. 22, 2020, Germany, 10 pages.
Japanese Patent Office, Office Action Issued in Application No. 2020-505176, dated Jan. 26, 2021,10 pages (Submitted with Machine Translation).

* cited by examiner

PACKET PROCESSING

CROSS REFERENCE TO RELATED APPLICATIONS

The present application is a U.S. National Phase of International Patent Application Serial No. PCT/CN2018/097254 entitled "MESSAGE PROCESSING," filed on Jul. 26, 2018. International Patent Application Serial No. PCT/CN2018/0927254 claims priority to Chinese Patent Application No. 201710638401.3 entitled "A METHOD AND DEVICE FOR PROCESSING A PACKET, AND NETWORK DEVICE" filed on Jul. 31, 2017. The entire contents of each of the above-cited applications are hereby incorporated herein by reference in their entirety for all purposes.

BACKGROUND

When receiving a packet, a network device may cache the packet to an external storage unit based on a queue to which the packet belongs. When sending a packet, the network device may read the packet from the external storage unit based on the queue to which the packet belongs and send the packet out. During access of a packet, two key factors are PKT (PACKET, packet entity) and PD (Packet Description, packet descriptor), respectively.

The network device may store PKT into a DDR SDRAM (Dual Data Rate Synchronous Dynamic Random Access Memory, hereinafter, "DDR") and store PD into a QDR SRAM (Quad Data Rate Static Random Access Memory, hereinafter, "QDR"). Since a QDR is used to store PD, the design cost of a single board is increased, and the pressure of wiring is increased. In addition, when sending a packet, the network device first reads the PD from the QDR and then reads the PKT from the DDR using the PD. Since the PD and the PKT are read separately in two steps, the reading efficiency is low.

DETAILED DESCRIPTION OF THE EMBODIMENTS

The terminology used in the examples of the present disclosure is only for the purpose of describing the particular examples, not intended to limit the present disclosure. As used in the present disclosure and appended claims, the singular forms "a/an", "said", and "the" intend to include the plural form, unless the content clearly dictates otherwise. It should also be understood that the term "and/or" herein means to include arbitrary and all possible combinations of one or more items listed in association.

It should be appreciated that although different information may be described using the terms such as first, second, third, etc. in examples of the present disclosure, such information should not be limited to these terms. Such terms are used only to distinguish the same type of information from each other. For example, without departing from the scope of the present disclosure, the first information may also be referred to as the second information and similarly, the second information may also be referred to as the first information. Depending on the context, the word "if" as used herein may be interpreted as "when" or "as" or "determining in response to".

In an example of the disclosure, a method of processing a packet which is applied to a network device is provided. The process of the packet by the network device will involve storing and reading of the packet. During the access process of the packet, two key factors are the packet to be stored and PD, respectively. The packet to be stored itself may also be referred to as a PKT (hereinafter, referred to as a packet), and the PD is used to record key information of the packet, such as the length of the packet, queue information, and storage address. The length of the PD is much smaller than that of the packet, and the PD carries a relatively small amount of information.

In an example of the present disclosure, packets and PDs may be stored in a same memory such as DDR memory to fully utilize DDR memory resources, thereby effectively reducing the design cost of a single board and the pressure of wiring. Moreover, since packets and PDs are stored in the same memory, when a packet is to be sent, the packet and the PD can be read from the same memory, and therefore, the reading efficiency is relatively high.

In an example of the present disclosure, a memory such as a DDR memory is divided into a plurality of first blocks, and each of the first blocks is further divided into a plurality of second blocks, and each of the second blocks may be a burst. Each of the second blocks is further divided into two storage spaces of different sizes, that is, a first storage space and a second storage space. The first storage space may be larger than the second storage space. Based on this, packets can be stored in the first storage space, and PDs can be stored in the second storage space, so that the packets and PDs are stored in the same memory.

Figure 1A:
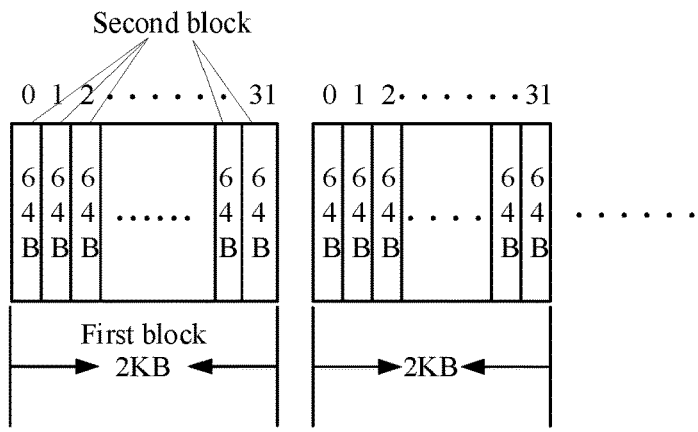
FIG. 1A-FIG. 1C are schematic diagrams of application scenarios in an example of the present disclosure.

In an example, referring to FIG. 1A, a DDR memory can be divided into a plurality of first blocks, each of which is a large block memory of 2 Kbytes. In addition, each first block can be divided into 32 second blocks, each of which is a small block memory of 64 bytes. That is, each first block of 2 Kbytes is divided into 32 second blocks of 64 bytes, and each second block can be a burst.

The above-mentioned 2 Kbytes, the number 32, 64 bytes, etc., are only an example of the present disclosure, and the specific numerical value is not limited. For example, assuming that the first block has a size of 2K bytes and the second block has a size of 128 bytes, the first block can be divided into 16 second blocks. For another example, assuming that the first block has a size of 4K bytes and the second block has a size of 64 bytes, the first block can be divided into 64 second blocks, and so on. For convenience of description, hereinafter, take that a first block of 2K bytes is divided into 32 second blocks of 64 bytes as an example.

Figure 1B:
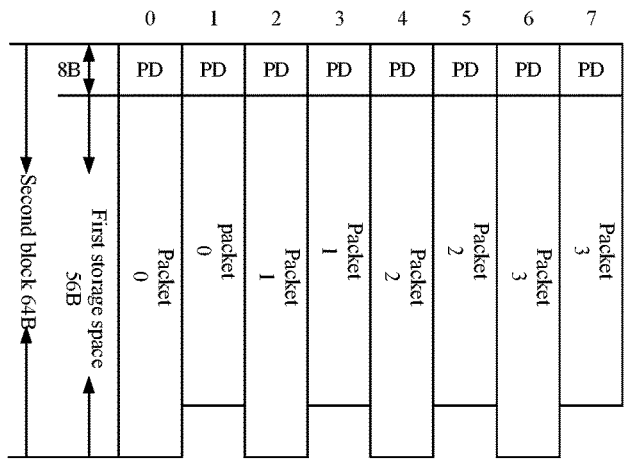

After the first block is divided into 32 second blocks, each second block may also be divided into two storage spaces of different sizes. The larger first storage space may have a size of, for example, 56 bytes, and is used to store packets. The smaller second storage space may have a size of, for example, 8 bytes, and is used to store PDs. Referring to FIG. 1B, the second block can store both packets and PDs. For example, assume that there are 4 packets (such as packet 0, packet 1, packet 2, packet 3) to be stored, and each of 4 packets has a size of 96 bytes. Then packet 0 is stored in the second block "0" and the second block "1"; the packet 0 can occupy 56 bytes of the first storage space of the second block "0", and 40 bytes in the first storage space of the second block "1". Additionally, the first 8 bytes of the second storage space of the second block "0" may store PDs, and the first 8 bytes of the second storage space of the second block "1" may also store PDs, and so on.

An example of an information field included in a PD is described in Table 1.

TABLE 1

| Information field | Information indicated by the information field |
| --- | --- |
| LEN | The length of a packet, the length being stored in a second block corresponding to the PD |
| SOP | Whether the second block corresponding to the PD is the first "second block" occupied by the stored packet |
| EOP | Whether the second block corresponding to the PD is the last "second block" occupied by the stored packet |
| BV | Whether the second block corresponding to the PD is valid |
| VAL | Whether the second block corresponding to the PD is the last "second block" in the first block where the second block is located |
| NBA | Points to the next "first block" occupied by the packet stored in the second block corresponding to the PD |
| NBN | The number of second blocks, occupied by the packet stored in the second block corresponding to the PD, in the next first block |

Figure 1C:
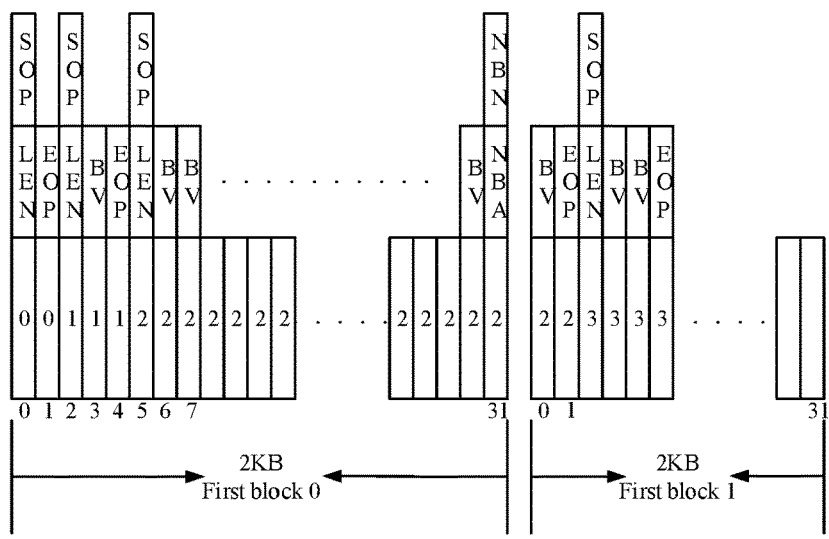

FIG. 1C shows an example of a PD. For simplicity, only part of information fields in the PD and the valid values therein are shown in FIG. 1C. The PDs stored in different second blocks may be the same or different. For example, in case that a packet occupies one or more second blocks, for the first "second block" of all the occupied second blocks, the information fields LEN and SOP in the PD in the first "second block" need an assignment. For example, when the value of the information field SOP in the PD stored in a certain second block is 0, it indicates that the certain second block is the first one of all "second blocks" into which the packet is stored. When the value of the information field SOP (hereinafter, also referred to "first flag") is 1, it indicates that the certain second block is not the first one of all "second blocks" into which the packet is stored. The value of the information field LEN is the length of the packet stored in the second block corresponding to the PD.

For the last "second block" of all "second blocks" occupied by the packet, the information field EOP (hereinafter, also referred to "second flag") in the PD in the last "second block" requires an assignment. For example, when the value of the information field EOP in the PD stored in a certain second block is 0, it indicates that the certain second block is the last "second block" for storing the packet. When the value of the information field EOP is 1, it indicates that the certain second block is not the last "second block" for storing the packet.

For any one of the second blocks occupied by the packet, the information field BV in the PD in the second block is assigned a valid value. For example, when the value of the information field BV in the PD stored in a certain second block is 0, it indicates that the certain second block is valid. However, when the value of the information field BV is 1, it indicates that the certain second block is invalid.

In addition, when a plurality of second blocks occupied by a packet belong to at least two "first blocks", for the last "second block" in a current first block among the at least two "first blocks" occupied by the packet, the last "second block" here being the last "second block" in the current first block not the last "second block" of all the second blocks occupied by the packet, the information fields VAL, NBA, and NBN in the PD in the last "second block" in the current first block require an assignment. The information field VAL may indicate whether the information field NBA is valid. For example, when the value of the information field VAL in the PD stored in a certain second block is 0, it indicates that the information field NBA in the PD is valid; however, when the value of the information field VAL in the PD is 1, it indicates that the information field NBA in the PD is invalid. The value of the information field NBA (Next Block Address) is the pointer address of the next first block occupied by the packet. The value of the information field NBN (Next Block Number) is the number of second blocks occupied by the packet in the next first block.

For example, in FIG. 1C, packet "1" occupies the second blocks "2", "3", and "4". The first "second block" of all the second blocks occupied by the packet "1" is the second block "2", and the value of the information field LEN in the PD corresponding to the second block "2" is, for example, 120, to indicate that the total length of packet "1" is 120 bytes. The value of the information field SOP in the PD in the second block "2" is 0 to indicate that the second block "2" is the first "second block" occupied by the packet "1". For any_one of the second blocks occupied by the packet "1" (such as the second block "2", the second block "3", and the second block "4", for simplicity, in FIG. 1C, only the BV corresponding to the second block "3" is shown as an example), the information field BV in the PD corresponding to the second block "3" has a value of 0 to indicate that the second block "3" is valid. The last "second block" of all the second blocks occupied by the packet "1" is the second block "4", and the information field EOP in the PD in the second block "4" has a value of 0 to indicate the second Block "4" is the last "second block" occupied by packet "1".

In this example, the PD in the second block "2" may record: LEN=120; SOP=0; BV=0; the PD in the second block "4" may record: EOP=0; BV=0. The PD in the second block "3" may record: BV=0.

For another example, the packet "2" occupies the second blocks "5" to "31" in the first block "0" and the second blocks "0" and "1" in the first block "1". The first "second block" of all the second blocks occupied by the packet "2" is the second block "5" in the first block "0", and the information field LEN the PD corresponding to the second block "5" in the first block "0" has a value of, for example, 1560, to indicate that the total length of the packet "2" is 1560 bytes. The information field SOP in the PD in the second block "5" in the first block "0" takes a value of 0 to indicate that the second block "5" is the first "second block" occupied by the packet "2". For any one of the second blocks occupied by the packet "2" (e.g., the second blocks "5" to "31" in the first block "0", and the second blocks "0" and "1" in the first block "1"), the information field BV in the PD corresponding to each of the occupied second blocks has a value of 0, to indicate that the occupied second blocks are valid. The second block "31" in the first block "0" occupied by the packet "2" is the last "second block" in the first block "0", and the information field NBA in the PD corresponding to the second block "31" in the first block "0" records the next first block occupied by the packet "2", i.e., the pointer of the first block "1", such as the address of the second block "0" of the first block "1". The information field NBN in the PD corresponding to the second block "31" in the first block "0" takes a value of 2 to record the number of second blocks occupied by the packet "2" in the first block "1". The information field VAL in the PD corresponding to the second block "31" in the first block "0" takes a value of 0 to indicate that the information field NBA is valid. The last "second block" of all the second blocks occupied by the packet "2" is the second block "1" in the first block "1", and the information field EOP in the PD corresponding to the second block "1" in the first block "1" corresponds to the PD takes a value of 0 to indicate that the second block "1" in the first block "1" is the last "second block" occupied by the packet "2"

In this example, the PD of the second block "5" in the first block "0" may record: LEN=1560; SOP=0; BV=0. The PD of the second block "31" in the first block "0" may record: BV=0; NBA=0x8049324 (which indicates the pointer address of the occupied next first block); NBN=2; VAL=0; for PDs of other second blocks, no further details are provided herein.

Figure 2A:
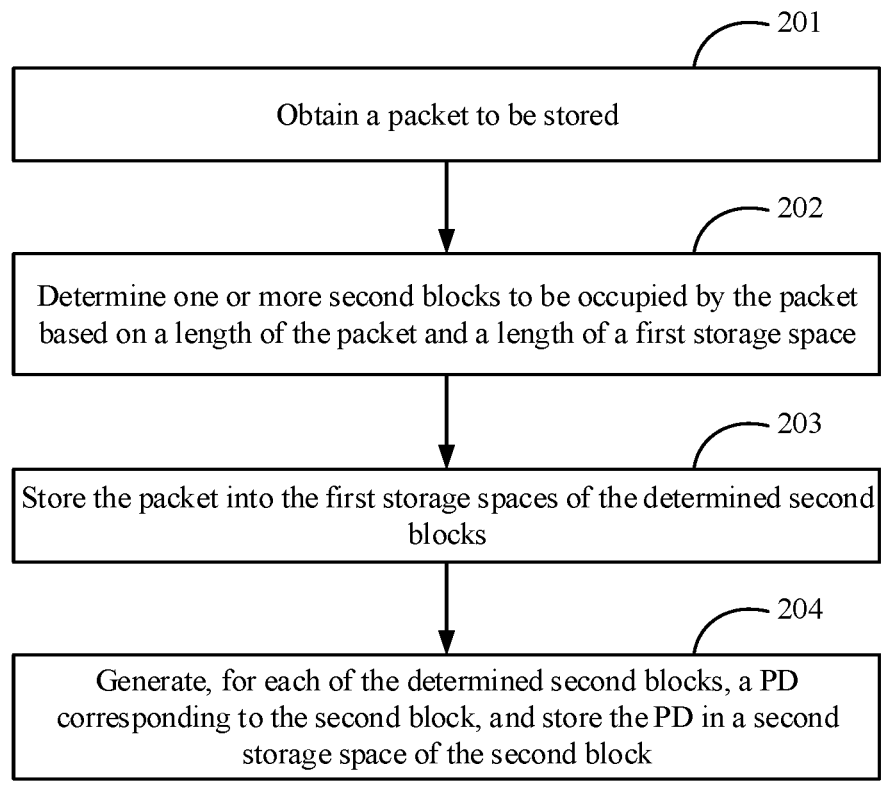
FIG. 2A is a schematic flowchart of storing a packet in an example of the present disclosure.

In the above application scenario, as shown in FIG. 2A, a schematic flowchart for storing a packet is illustrated.

Step 201: Obtain a packet to be stored.

Step 202: Determine one or more second blocks to be occupied by the packet based on a length of the packet and a length of a first storage space.

Step 203: Store the packet in a first storage space of each of the determined second blocks.

Step 204: For each of the determined second blocks, generate a PD corresponding to the second block, and store the PD in a second storage space of the second block.

Figure 2B:
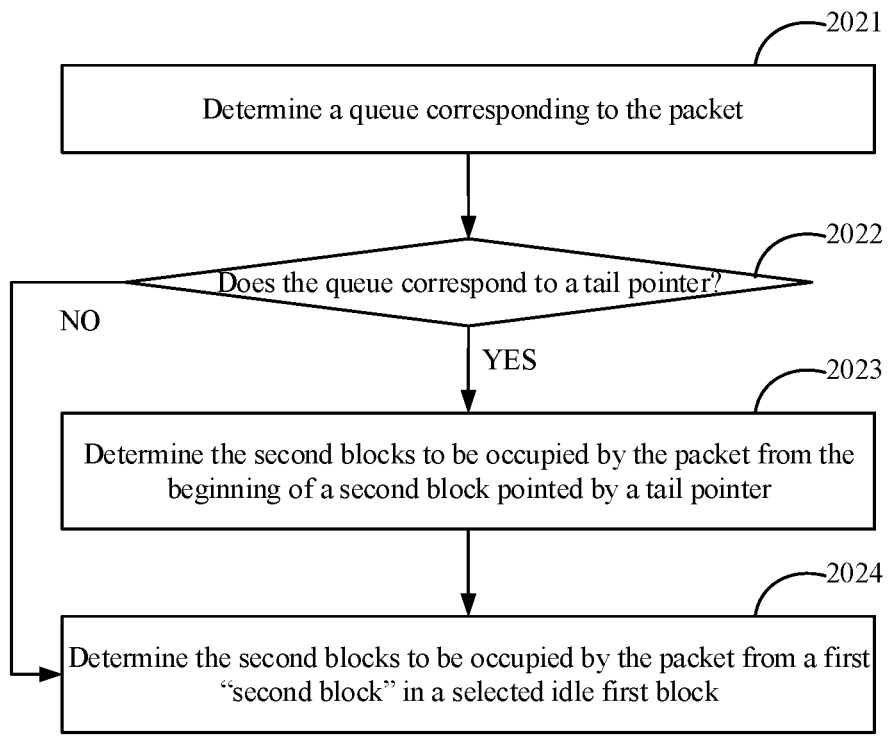
FIG. 2B is a schematic flowchart of determining a second block to be occupied by a packet in an example of the present disclosure.

In an example, as shown in FIG. 2B, the "determine one or more second blocks to be occupied by the packet" in step 202 may include but is not limited to the following.

Step 2021: Determine a queue corresponding to the packet.

Step 2022: Determine whether the queue corresponds to a tail pointer. If yes, go to step 2023, otherwise go to step 2024.

Step 2023: Determine the second blocks to be occupied by the packet from a second block pointed by a tail pointer if the queue corresponds to the tail pointer;

Step 2024: Select an idle first block, and determine the second blocks to be occupied by the packet from a first "second block" in the selected first block if the queue does not correspond to a tail pointer.

In an example, first, the number N of the second blocks to be occupied by the packet may be determined based on the length of the packet and the length of the first storage space. Then, the N second blocks to be occupied by the packet may be determined from the second block pointed by the tail pointer or the first "second block" in the selected first block. Each of the second blocks is configured to store a packet fragment of the packet. For example, if the packet needs to occupy three "second blocks", the packet can be divided into three packet fragments, and each packet fragment takes up one "second block".

The network device can store packets by queues, and each queue has a unique queue identifier. Of course, the way in which packets are stored in queues is only an example. The network device can also store packets in other ways. By storing packets in a queue, different types of packets may be efficiently stored in different queues. For example, the network device includes three queues (such as FIFO (First-In First-Out) queues), and the queue identifiers of the three queues are queue A, queue B, and queue C, respectively. The queue A is used to store packets with a feature A (for example, an egress interface is an interface A), and the queue B is used to store packets with a feature B (for example, the egress interface is an interface B), and the queue C is used to store packets with a feature C (for example, the egress interface is an interface C).

After obtaining a packet to be stored, the network device may first determine the queue corresponding to the packet. If the packet is the first packet corresponding to the queue, the queue does not have a corresponding tail pointer and a head pointer. If the packet is not the first packet corresponding to the queue, the queue corresponds to a tail pointer and a head pointer.

The head pointer indicates a pointer to the first packet header corresponding to the queue, such as the start address or the start position of the first packet in the queue. The tail pointer indicates a pointer to the end of the last packet corresponding to the queue, such as the end address or end position of the last packet in the queue.

For example, when the queue is empty, if the packet "1" to be stored is obtained, the packet "1" is stored in the queue, and the head pointer of the queue is updated to point to the start address of the packet "1", and the tail pointer of the queue is updated to point to the end address of the packet "1". Then, if the packet "2" to be stored in the queue is obtained, the packet "2" is stored in the queue, and the tail pointer of the queue is updated to point to the end address of the packet "2". In such a way, each time a packet of the queue is received, the tail pointer of the queue can be updated.

If a packet in the queue is to be read, the reading begins from the head pointer of the queue. For example, after the packet "1" is read, the packet "1" is deleted from the queue, and the head pointer of the queue is updated to point to the start address of the packet "2". In such a way, each time a packet is read and deleted from the queue, the head pointer of the queue can be updated. In a word, the process of storing packets is to store the packets sequentially from the tail pointer of the queue, and the process of reading the packets is to read the packets sequentially from the head pointer of the queue.

In an example, the step 2023 may include: selecting N second blocks from a second block next to the second block pointed by the tail pointer, where the N is determined based on the length of the packet and the length of the first storage space. For example, if the tail pointer points to the second block "10" in the first block "1", and the packet is determined to occupy 2 second blocks based on the packet length of 100 bytes and the first storage space length of 56 bytes, then the second blocks to be occupied by the packet are the second block "11" and the second block "12" in the first block "1". For another example, if the tail pointer points to the second block "30" in the first block "1", and the packet is determined to occupy 2 second blocks based on the packet length of 100 bytes and the first storage space length of 56 bytes, then an idle first block (such as first block "3") is newly requested since the first block "1" does not have two free second blocks. Based on this, the second blocks to be occupied by the packet may be the second block "31" in the first block "1" and the second block "0" in the first block In addition, in step 2023, after determining the second blocks to be occupied by the packet, the tail pointer of the queue may be updated to point to the end address of the last "second block" occupied by the packet, for example, the end address the second block "12".

In an example, the step 2024 may include: selecting N second blocks from the first packet, the tail pointer of the queue may be updated to point to the end address of the last "second block" occupied by the packet, for example, the end address the second block "12".

In an example, the step 2024 may include: selecting N second blocks from the first "second block" in the selected idle first block, where the N is determined based on the length of the packet and the length of the first storage space. For example, if the idle first block "2" is selected, and the packet is determined to occupy 2 second blocks based on the packet length of 100 bytes and the first storage space length of 56 bytes, then the second blocks to be occupied by the packet may be the second block "0" and the second block "1" in the first block "2".

In addition, in step 2024, after determining the second blocks to be occupied by the packet, the head pointer of the queue may be updated to point to the start address of the first "second block" occupied by the packet, and the tail pointer of the queue may be updated to point to the end address of the last "second block" occupied by the packet.

The network device can maintain an idle address pool for storing all of the idle first blocks. When requesting for an idle block, the idle block may be selected from the idle address pool in units of the first block, that is, one or more first blocks instead of one or more second blocks are requested for each time. When the memory is retrieved, it is also retrieved in units of the first block, that is, one or more first blocks instead of one or more second blocks are retrieved into the idle address pool.

In an example, when the packet is stored into the first storage spaces of the determined second blocks in step 203, if the packet is to occupy N second blocks, the packet can be divided into N packet segments, and the N packet segments can be stored in the first storage spaces of the N second blocks respectively. For example, if the length of the packet is 100 bytes and the packet is to occupy the second block "11" and the second block "12", the first 56 bytes of the packet may be assigned to the packet fragment "1" and the packet segment "1" is stored into the first storage space of the second block "11"; the last 44 bytes of the packet may be assigned to the packet segment "2", and the packet segment "2" is stored into the first storage space of the second block "12".

In an example, when the packet is to occupy one or more second blocks, generating the PD corresponding to the second block in step 204 may include, but is not limited to, if the second block is the first "second block" of all the second blocks to be occupied by the packet, the length of the packet is recorded in the PD of the second block, and the first flag in the PD of the second block is set as valid to indicate that the second block is the first "second block" occupied by the packet. If the second block is the last "second block" in all the second blocks to be occupied by the packet, the second flag in the PD of the second block is set as valid to indicate the second block is the last "second block" occupied by the packet. If the second block is any_one of the second blocks to be occupied by the packet, the flag indicating whether the current block is occupied in the PD of the second block is set as valid. In examples of the disclosure, any flag in the PD may be set by assigning a value to the flag. For example, the information field SOP, the information field EOP, the information field BV, and the like may be assigned a value, respectively.

In addition, when all the second blocks to be occupied by the packet belong to at least two first blocks, if the second block is the last "second block" occupied by the packet in a certain first block, the information field NBA in the PD of the second block is to be assigned a pointer to the next first block to be occupied by the packet, the information field NBN is assigned a value of a number of the second blocks to be occupied by the packet in the next first block, and the information field VAL is assigned a valid value.

The foregoing process of generating the PD can be seen in FIG. 1C, and details are not described herein again.

In an example, when the PD is stored in the second storage space of the second block in step 204, assume that the packet is to occupy the second block "11" and the second block "12". Then, it may be determined that the packet length is stored in the second storage space of the second block "11" at the position corresponding to the information field LEN of the PD, and the information field SOP corresponding to the PD in the second storage space of the second block "11" is assigned a value to indicate that the second block "11" is the first "second block" occupied by the packet, and the information field BV corresponding to the PD in the second storage space of the second block "11" is assigned a value to indicate that the second block "11" is occupied by the packet. And it may be determined that the information field EOP corresponding to the PD in the second storage space of the second block "12" is assigned a value to indicate that the second block "12" is the last "second block" occupied by the packet, and the information field BV corresponding to the PD in the second storage space of the second block "12" is assigned a value to indicate that the second block "12" is occupied by the packet.

Based on the above technical solution, a DDR memory is divided into a plurality of first blocks, and each of the first blocks is divided into a plurality of second blocks, and each of the second blocks includes a first storage space and a second storage space. Therefore, a packet can be stored into the first storage space, and a PD can be stored into the second storage space. In this way, the packet and the PD can be stored in the same memory, which can fully utilize the DDR resources, and effectively reduce the design cost of the single board and reduce the pressure of wiring.

Figure 2C:
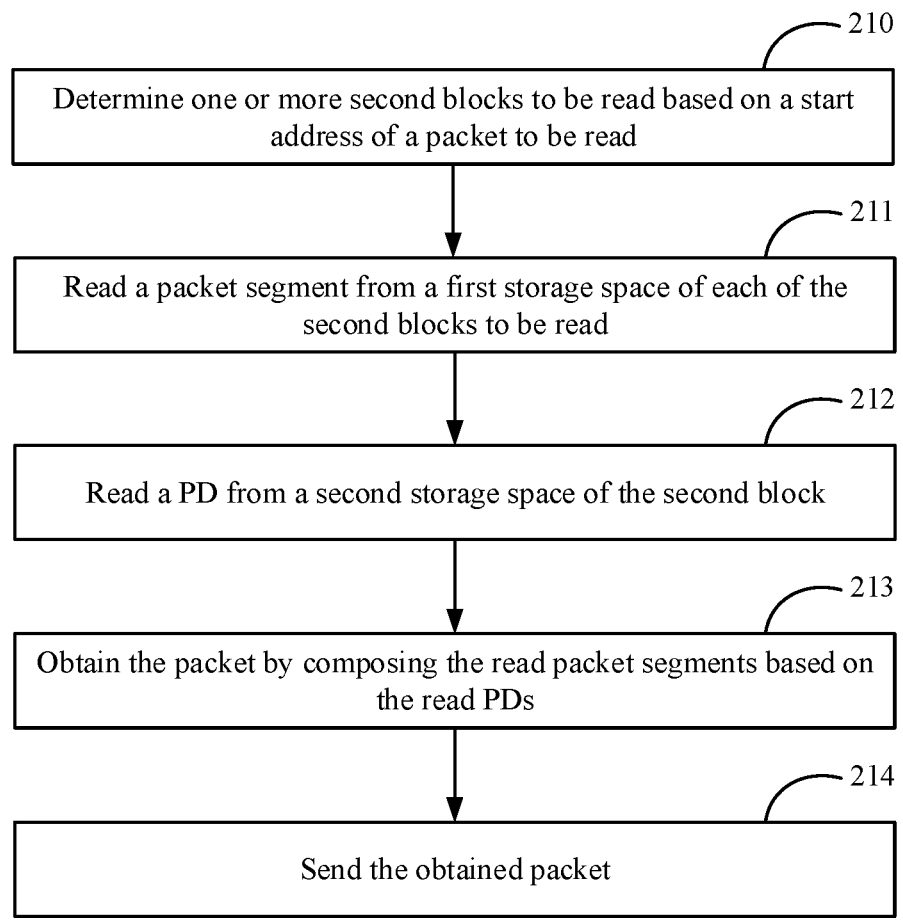
FIG. 2C is a schematic flowchart of reading a packet in an example of the present disclosure.

Correspondingly, referring to FIG. 2C, a schematic flowchart for reading a packet is illustrated. The flowchart includes the following steps.

Step 210: Determine one or more second blocks to be read based on a start address of a packet to be read.

Step 211: Read a packet segment from a first storage space of each of the second blocks to be read.

Step 212: Read a PD from a second storage space of the second block.

Step 213: Obtain the packet by composing the read packet segments based on the read PDs.

Step 214: Send the obtained packet.

The steps 210 to 214 shown in FIG. 2C illustrate a process of reading a packet, and a process of transmitting a packet.

In an example, the PD is read from the second storage space of each second block to be read, and the second block corresponding to the PD in which the information field SOP is valid is determined as an initial second block, and the second block corresponding to the PD in which the information field EOP is valid is determined as an end second block. If no PD in which the information field EOP is valid is read from the current first block, a PD is read from the second storage space of the last "second block" in the first block, so as to obtain a pointer to the next first block based on the information field NBA in the read PD, obtain a number of second blocks occupied by the packet in the next first block based on the information field NBN in the PD, and read the PD from the second storage space of the second block in the next first block based on the pointer and the number of second blocks. Repeat the above until the PD in which the information field EOP is valid is read, and the second block corresponding to the PD in which the information field EOP is valid is determined as an end second block. A packet fragment is read from a first storage space of each of the second blocks between the initial second block and the end second block, and the read packet fragments are composed into a packet, and the composed packet is sent.

When a packet in a queue is to be sent, the head pointer of the queue is queried, the head pointer pointing to the header of the first packet in the queue, for example, the start address of the first packet. The start address can be the address of the second block. Then, the first block to which the second block belongs is determined, and the PD is read from the second storage space of the second block of the first block.

Referring to FIG. 1C, the information field SOP in the PD of the second block "0" in the first block "0" is valid, and the information field EOP in the PD of the second block "1" in the first block "0" is valid, Therefore, the second block "0" in the first block "0" is determined as an initial second block, and the second block "1" in the first block "0" is determined as an end second block. Correspondingly, the packet fragments are read from the first storage spaces of the second block "0" and the second block "1" in the first block "0", and the read packet fragments are composed into the packet "0", and the packet "0" is sent.

Since the information field SOP in the PD of the second block "2" in the first block "0" is valid, and the information field EOP in the PD of the second block "4" in the first block "0" is valid, the second block "2" in the first block "0" is determined as an initial second block, and the second block "4" in the first block "0" is determined as an end second block. Correspondingly, the packet fragments are read from the first storage spaces of the second block "2", the second block "3", and the second block "4" in the first block "0", and the read packet fragments are composed into the packet "1", and the packet "1" is sent.

For another example, since the information field SOP in the PD of the second block "5" in the first block "0" is valid, the second block "5" in the first block "0" is determined as an initial second block. Since the information fields EOP in the PDs of the second blocks "6"–"31" after the second block "5" in the first block "0" are not valid, a pointer to the next first block is obtained from the information field NBA in the PD of the second block 31, the number M of the second blocks occupied by the packet in the next first block is obtained from the information field NBN in the PD of the second block 31, and the address of the next first block_ (exemplified by the first block "1" in the figure) is determined based on the obtained pointer, and the PDs are read from the second storage spaces of the first M second blocks (exemplified by the second block "0" and the second block "1" in the figure) of the first block "1". Since the information field EOP in the PD of the second block "1" in the first block "1" is valid, the second block "1" in the first block "1" is determined as an end second block. Then, the packet fragments are read from the first storage spaces of the second blocks "5"–"31" in the first block "0", and the second blocks "0" and "1" in the first block "1". And the read packet fragments are composed into packet "2", and the packet "2" is sent.

In an example, after the packet segment is read from the first storage space of each second block between the initial second block to the end second block, the first storage space occupied by the read packet segment may be released. When the first storage space of each second block of a certain first block is released, the certain first block may be retrieved as an idle first block, for example, the certain first block may be retrieved into the idle address pool. The network device can then use the certain first block to store new packet fragments. In addition, the network device may further update the head pointer of the queue based on the address of the next first block pointed by the first block.

In an example, after the first block is retrieved as an idle first block, the second storage space of each of the second blocks in the first block may also be released.

Alternatively, after the first block is retrieved as the idle first block, the second storage space of each second block in the first block may not be released but to adjust an inverse flag of the first block. For example, each time the network device generates the PD corresponding to the second block, the network device may obtain the current inverse flag of the first block to which the second block belongs, and determine that the PD corresponding to the second block includes the inverse flag. Among them, the inverse flag is different when the first block is used twice in succession. The inverse flags for two successive uses of the first block are different. For example, the first time the first block is used, the inverse flag is 0, and the second time the first block is used after being retrieved as an idle first block, the inverse flag is modified to be different from 0 (for example, 1). The inverse flag for the third use of the first block after being retrieved as an idle first block is modified to be different from 1 (for example, 0 or 2), and so on.

Figure 3A:
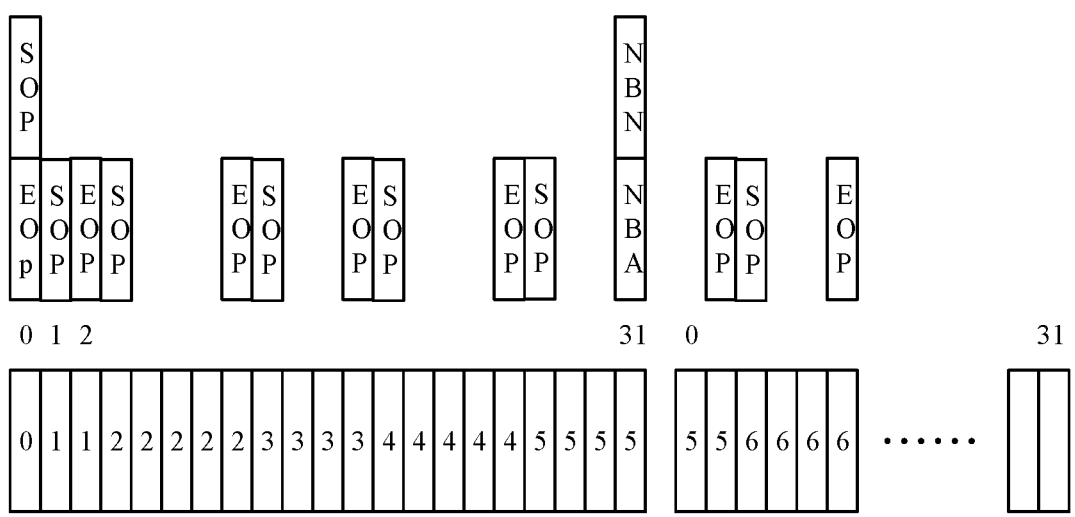
FIG. 3A-FIG. 3E are schematic diagrams of application scenarios in another example of the present disclosure.

For example, when the first block "1" is used to store a packet for the first time, a PD is written into the second storage space of each second block in the first block "1". Referring to FIG. 3A, an example of writing a PD into the second storage space is shown. After the read operation for the first block "1" is completed, if these PDs are not processed, an error occurs. It is assumed that, when the first block "1" is used to store a packet for the second time, the packet segment and a PD is written into only the second blocks "0", "1", and "2" in the first block "1", not written into other second block in the first block "1". Thus, when the read operation is performed again for the first block "1", the packet segment can only be read from the second blocks "0", "1", and "2", but can be from the second block 0, but the PD can be read from the second blocks "0"–"31", and therefore, an error occurs when the read packet fragments are grouped based on these PDs.

In view of the above, in an example, after the read operation for the first block "1" is completed, the PD of the second storage space of each of the second blocks in the first block "1" is deleted. However, in this way, each time the read operation for the first block "1" is completed, the PD of the second storage space of each second block of the first block "1" is to be deleted, resulting in repeat operations for the second block and reducing the processing performance of the network device.

In another example, an inverse flag is set for each first block, and the inverse flag may be a first value, such as 0 or a second value, such as 1. Based on this, each time the read operation of the first block is completed, after the first block is retrieved as an idle first block, if the previous inverse flag of the first block is marked as the first value, then the current inverse flag of the first block is modified to the second value; conversely, if the previous inverse flag of the first block is the second value, the current inverse flag of the first block may be modified to be the first value.

On the basis of this, each time the PD is stored in the second storage space of the second block in the first block, the PD may further include a current inverse flag of the first block. For example, in FIG. 3B and FIG. 3D, the PD in the second storage space of the second block may further include an information field SEL for recording the current inverse flag of the first block in addition to the above information fields LEN, SOP, EOP, BV, VAL, NBA, NBN. Or in FIG. 3C and FIG. 3E, the PD of the second storage space of the second block may include two sets of information fields LEN, SOP, EOP, BV, VAL, NBA, NBN. Wherein, when the information fields LEN0, SOP0, EOP0, BV0, VAL0, NBA0, NBN0 are valid, it indicates that the current inverse flag corresponding to the first block is the first value, and when the information fields LEN1, SOP1, EOP1, BV1, VAL1, NBA1, NBN1 are valid, it indicates that the current inverse flag corresponding to the first block is the second value.

Figure 3B:
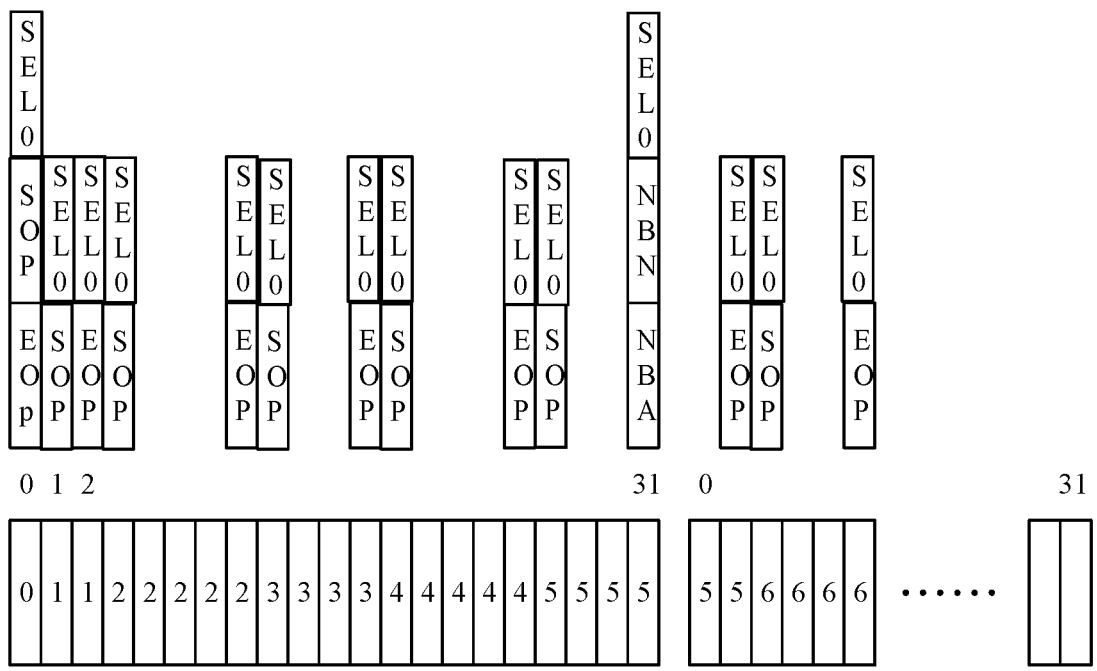
Figure 3C:
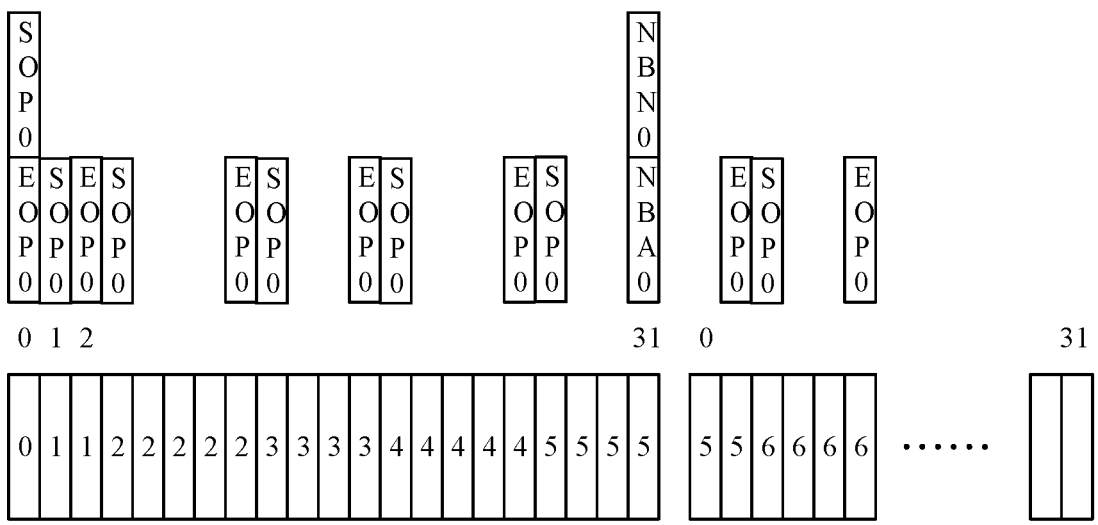

Thus, if the current inverse flag of the first block is 0, in FIG. 3A, the information field SEL in the corresponding PD may take a value of 0 shown in FIG. 3B, and is simplified as "SEL0" shown in FIG. 3B, to indicate that the current inverse flag of the first block is 0. Alternatively, in FIG. 3C, the information fields SOP0, EOP0, NBN0, and NBA0 in the corresponding PD are valid. The value "0" in the information fields SOP0, EOP0, NBN0, and NBA0 indicates that the current inverse flag of the first block is 0.

Then, when the first block is retrieved as an idle first block, since the previous inverse flag corresponding to the first block is 0, the current inverse flag of the first block is modified to 1. When the first block is used to store the packet again, if the packet and the PD are written only into the second blocks "0", "1", and "2", the information fields SEL in the corresponding PDs may take a value "1" shown in FIG. 3D (simplified as "SEL1") to indicate that the current inverse flag of the first block is 1. Alternatively, in FIG. 3E, the information fields SOP1, EOP1 in the corresponding PD are valid.

Figure 3D:
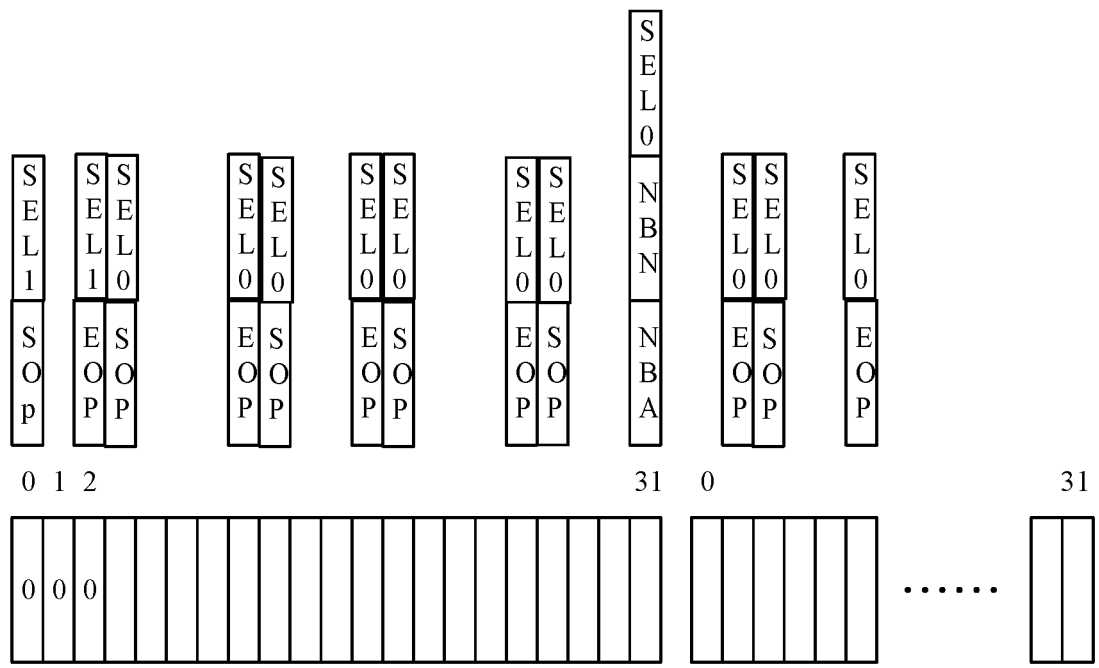
Figure 3E:
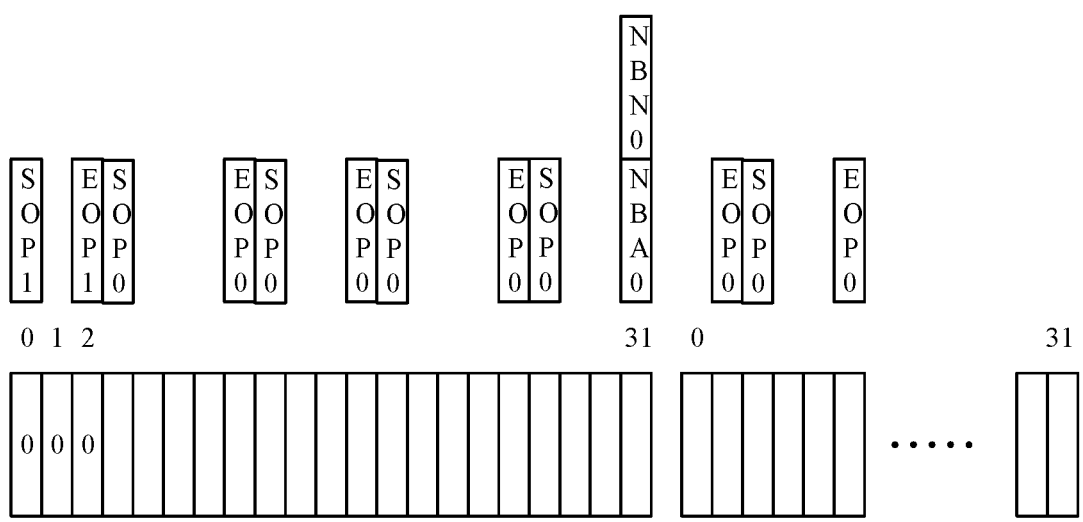

By comparing FIG. 3D with FIG. 3B, when a read operation is performed for the first block, the PD can be read from the second blocks "0" to "31", but only the information fields SEL of the PDs corresponding to the second blocks "0", "1" and "2" take a value "1". That is, only the second blocks "0", "1", and "2" are used when the current inverse flag of the first block is "1". Therefore, only the PDs in the second storage spaces of the second blocks "0", "1", and "2" are used to compose the read packet fragments, and no error will occur. Similarly, by comparing FIG. 3C with FIG. 3E, it is also possible that only the PDs in the second storage spaces of the second blocks "0", "1", and "2" are used to compose the read packet fragments.

Figure 4:
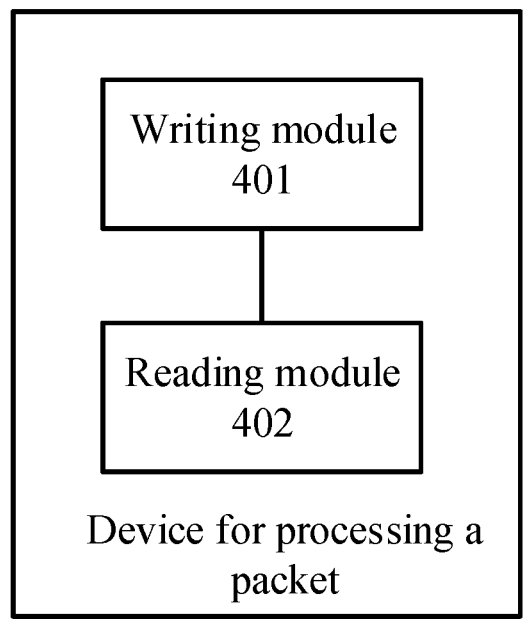
FIG. 4 is a structural diagram of a device for processing a packet in an example of the present disclosure.

Based on the same concept as the above method, a device for processing a packet is further provided in an example of the disclosure, where a memory is divided into a plurality of first blocks, each of the first blocks being divided into a plurality of second blocks, and each of the second blocks including a first storage space and a second storage space. As shown in FIG. 4, the device includes the following modules.

A writing module 401 is configured to obtain a first packet to be stored, determine one or more second blocks to be occupied by the first packet based on a length of the first packet and a length of the first storage space, store the first packet in a first storage space of each of the determined second blocks; for each of the determined second blocks, generate a packet descriptor (PD) corresponding to the second block, and store the PD in a second storage space of the second block.

A reading module 402 is configured to determine one or more second blocks to be read based on a start address of a second packet to be read, read a packet fragment from the first storage space of each of the second blocks to be read, and read the PD from the second storage space of the second block to be read, and obtain the second packet by composing the read packet segments based on the read PDs. In an example, the reading module 402 is also configured to send the composed second packet. It should be noted that, the first packet to be stored and the second packet to be read may be the same packet or different packets, which is not limited in the disclosure.

In an example, in the process of determining the second blocks to be occupied by the packet, the writing module 401 is specifically configured to: determine a queue corresponding to the first packet; when the queue has a tail pointer, determine the second blocks to be occupied by the first packet with a start from a second block pointed by the tail pointer; when the queue does not have a tail pointer, select an idle first block, and determine the second blocks to be occupied by the first packet with a start from a first second block in the selected idle first block.

In an example, in the process of generating the PD corresponding to the second block, the writing module 401 is specifically configured to: when the second block is a first second block to be occupied by the first packet, record a length of the first packet in the PD corresponding to the second block, and set the first flag in the PD corresponding to the second block to be valid to indicate that the second block is the first second block for storing the first packet; when the second block is a last second block to be occupied by the first packet, set the second flag in the PD corresponding to the second block to be valid to indicate that the second block is the last second block for storing the first packet.

In an example, when all the second blocks to be occupied by the first packet occupy belong to at least two different first blocks, in the process of generating the PD corresponding to the second block, the writing module 401 is specifically configured to: when the second block is a last second block of a current first block, but is not a last second block to be occupied by the first packet, record a pointer to a next first block to be occupied by the first packet in the PD corresponding to the second block, and record a number of the second blocks to be occupied by the first packet in the next first block in the PD corresponding to the second block.

In an example, in the process of generating the PD corresponding to the second block, the writing module 401 is specifically configured to: obtain a current inverse flag of the first block to which the second block belongs, wherein, the inverse flags for two successive uses of the first block are different; and determine that the PD corresponding to the second block includes the current inverse flag of the first block.

The reading module 402 is specifically configured to: read the PD from the second storage space of each second block of a current first block to which the second block to be read belongs, and determine a second block corresponding to the PD in which the first flag is valid as an initial second block for storing the second packet; when a PD in which the second flag is valid is read from the current first block, determine the second block corresponding to the PD in which the second flag is valid as an end second block for storing the second packet; when no PD in which the second flag is valid is read from the current first block, read the PD from the second storage space of a last second block of the current first block so as to obtain a pointer to a next first block, and obtain a number of second blocks to be occupied by the second packet in the next first block, read PDs from the second storage spaces of the second blocks in the next first block based on the pointer and the number of second blocks. Repeat the above until the PD in which the second flag is valid is read, and the second block corresponding to the PD in which the second flag is valid in the next first block is determined as an end second block for storing the second packet; a packet fragment is read from the first storage space of each of the second blocks between the initial second block and the end second block. The read packet fragments are composed into the second packet, and the composed second packet is sent.

The reading module 402 is further configured to: release the first storage space occupied by the read packet segment after reading the packet segments from the first storage space of each second block between the initial second block and the end second block; when the first storage space of each second block in the current first block is released, retrieve the current first block as an idle first block, and release the second storage space of each second block in the current first block or adjust the inverse flag of the current first block after the first block is retrieved as idle.

Figure 5A:
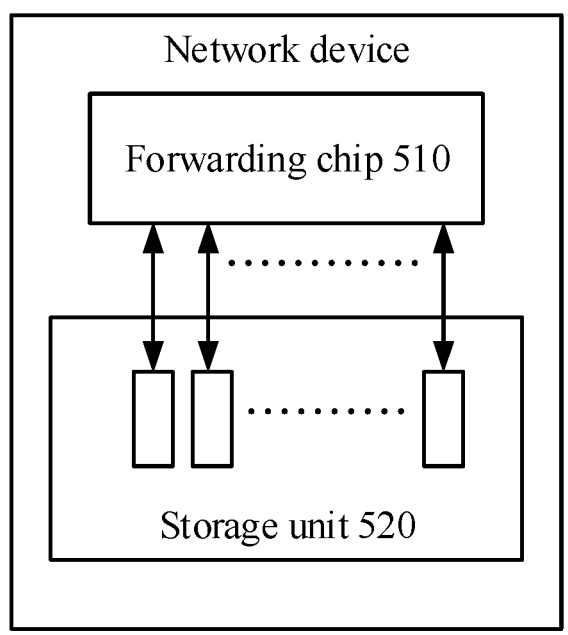
FIG. 5A and FIG. 5B are hardware structural diagrams of a network device in an example of the present disclosure.

Based on the same concept as the above method, a network device is also provided in an example of the present disclosure. As shown in FIG. 5A, the hardware structure of the provided network device is illustrated on a hardware level. The network device includes a forwarding chip 510 and a storage unit 520. The storage unit 520 is separately disposed from the forwarding chip 510. For example, the storage unit 520 may be a DDR memory. Of course, the storage unit 520 may also be other type of storage unit, which is not restricted.

The memory of the storage unit 520 is divided into a plurality of first blocks, each of the first blocks is divided into a plurality of second blocks, and each of the second blocks includes a first storage space and a second storage space.

The forwarding chip 510 is configured to obtain a first packet to be stored, determine one or more second blocks to be occupied by the first packet based on a length of the first packet and a length of the first storage space, store the first packet in a first storage space of each of the determined second blocks in the storage unit 520; for each of the determined second blocks, generate a packet descriptor (PD) corresponding to the second block, and store the PD in a second storage space of the second block; determine one or more second blocks to be read based on a start address of a second packet to be read, read a packet fragment from the first storage space of each of the second blocks to be read in the storage unit 520, and read the PD from the second storage space of the second block to be read in the storage unit 520, obtain the second packet by composing the read packet segments based on the read PDs, and send the second packet.

The forwarding chip 510 can implement the foregoing method for processing a packet, which includes performing each operation of the foregoing method. For example, the process for implementing the method for processing a packet can be written into the forwarding chip 510, so that the forwarding chip 510 can perform various operations of the method for processing a packet, and details are not described herein.

The forwarding chip 510 may include, but is not limited to, an FPGA (Field-Programmable Gate Array), a CPLD (Complex Programmable Logic Device), and the like. The type of the forwarding chip 510 is not limited, as long as it can achieve the above functions.

In an example, since the storage unit 520 is an off-chip memory of the forwarding chip 510, such as DDR, the forwarding chip 510 can read a packet and a PD from a same memory by storing the packet and the PD in the same memory in the storage unit 520. Therefore, the reading efficiency is relatively high.

Figure 5B:
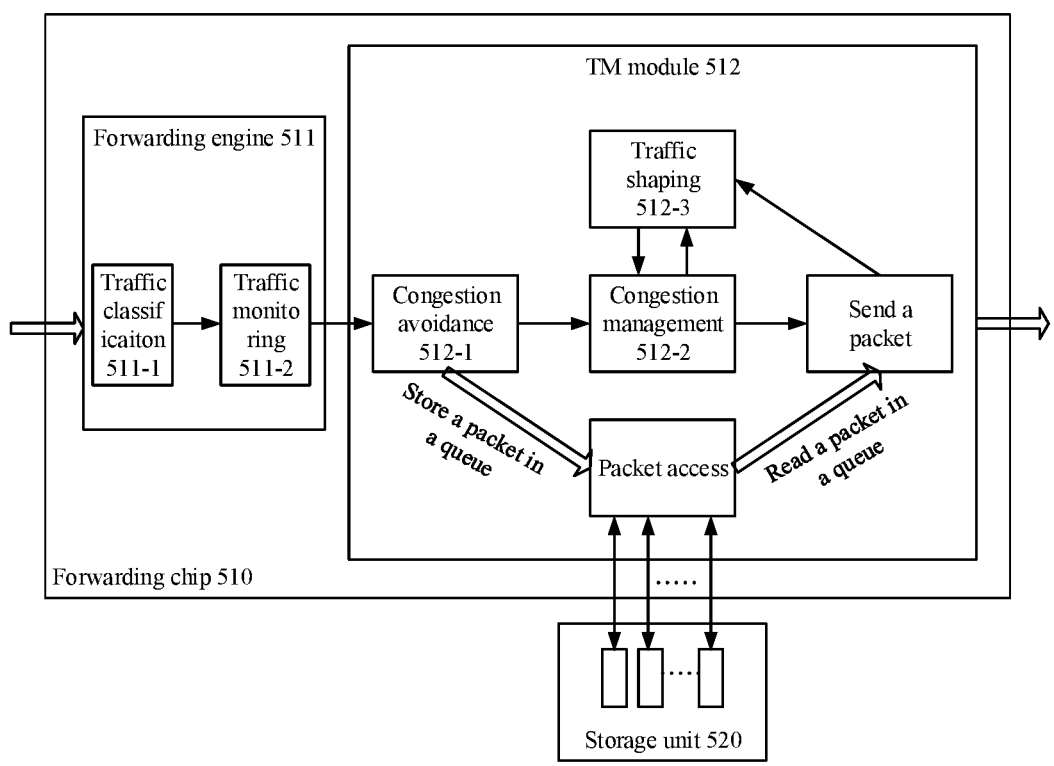

In another example, as shown in FIG. 5B, the forwarding chip 510 may further include a forwarding engine 511 and a TM (Traffic Manage) module 512. After receiving a packet, the forwarding engine 511 can perform traffic classification 511-1 and traffic monitoring (such as a CAR (Committed Access Rate) rate limit operation) 511-2, and output the packet to the TM module 512.

After receiving the packet, the TM module 512 can perform operations such as congestion avoidance 512-1, congestion management 512-2, traffic shaping 512-3, and the like. The congestion avoidance 512-1 may include, for example, WRED (Weighted Random Early Detection), tail drop, and the like; the congestion management 512-2 may include, for example, PQ (Priority Queue) scheduling, WFQ (Weighted Fair Queue) scheduling, etc. In addition, when receiving a packet, the TM module 512 can buffer the packet into the storage unit 520 according to the queue to which the packet belongs. When the TM module 512 is to send a packet, the TM module 512 reads the packet from the storage unit 520 and sends it according to the queue to which the packet belongs.

The process in which the TM module 512 buffers the packet to the storage unit 520 and the TM module 512 reads the packet from the storage unit 520 and sends the packet is the above method for processing a packet, and details are not described herein again.

The above description is only for the examples of the present disclosure, and is not intended to limit the disclosure. Various changes and modifications can be made to the present disclosure by those skilled in the art. Any modifications, equivalents, improvements, etc. made within the spirit and scope of the present disclosure are intended to be included within the scope of the appended claims.

The invention claimed is:

1. A method of processing a packet, wherein, a memory is divided into a plurality of first blocks, each of the first blocks being divided into a plurality of second blocks, each of the second blocks including a first storage space and a second storage space, and the method comprising:
   obtaining a first packet to be stored;
   determining one or more second blocks to be occupied by the first packet based on a length of the first packet and a length of the first storage space;
   storing the first packet in a first storage space of each of the determined second blocks;
   for each of the determined second blocks,
      generating a packet descriptor (PD) corresponding to the second block, and
      storing the PD in a second storage space of the second block;
   determining one or more second blocks to be read based on a start address of a second packet to be read;
   for each of the determined second blocks to be read,
      reading a packet fragment from a first storage space of the second block to be read, and
      reading the PD from a second storage space of the second block to be read; and
   obtaining the second packet by composing the read packet segments based on the read PDs, and sending the second packet, wherein reading the packet segment from the first storage space of the second block to be read, and reading the PD from the second storage space of the second block to be read comprises:
  reading the PD from the second storage space of each second block of a current first block to which the second block to be read belongs, and determining a second block corresponding to the PD in which a first flag is valid as an initial second block for storing the second packet;
  in a case that a PD in which a second flag is valid is read from the current first block,
    determining the second block corresponding to the PD in which the second flag is valid as an end second block for storing the second packet;
  in a case that no PD in which the second flag is valid is read from the current first block,
    reading the PD from the second storage space of a last second block of the current first block so as to obtain a pointer to a next first block from the PD,
    obtaining a number of second blocks to be occupied by the second packet in the next first block from the PD,
    reading PDs from the second storage spaces of the second blocks in the next first block based on the pointer and the number of second blocks, and
    determining the second block corresponding to the PD in which the second flag is valid in the next first block as an end second block for storing the second packet; and
  reading a packet fragment from the first storage space of each of the second blocks between the initial second block and the end second block.

2. The method according to claim 1, wherein determining one or more second blocks to be occupied by the first packet comprises:
  determining a queue corresponding to the first packet;
  in a case that the queue has a tail pointer, determining the second blocks to be occupied by the first packet with a start from a second block pointed by the tail pointer;
  in a case that the queue does not have a tail pointer, selecting an idle first block, and determining the second blocks to be occupied by the first packet with a start from a first second block in the selected idle first block.

3. The method according to claim 1, wherein generating the PD corresponding to the second block comprises:
  in a case that the second block is a first second block to be occupied by the first packet,
    recording the length of the first packet in the PD corresponding to the second block, and
    setting a first flag in the PD corresponding to the second block to be valid to indicate that the second block is the first second block for storing the first packet;
  in a case that the second block is a last second block to be occupied by the first packet,
    setting a second flag in the PD corresponding to the second block to be valid to indicate that the second block is the last second block for storing the first packet.

4. The method according to claim 1, wherein generating the PD corresponding to the second block comprises:
  in a case that the second block is a last second block of a current first block, but is not a last second block to be occupied by the first packet,
    recording a pointer to a next first block to be occupied by the first packet in the PD corresponding to the second block, and
    recording a number of the second blocks to be occupied by the first packet in the next first block in the PD corresponding to the second block.

5. The method according to claim 1, wherein generating the PD corresponding to the second block comprises:
  obtaining a current inverse flag of the first block to which the second block belongs, wherein, the inverse flags for two successive uses of the first block are different; and
  determining that the PD corresponding to the second block includes the current inverse flag of the first block.

6. The method according to claim 1, further comprising:
  releasing the first storage space occupied by the read packet segment;
  in a case that the first storage space of each second block in the current first block is released,
  retrieving the current first block as an idle first block, and
  releasing the second storage space of each second block in the current first block or adjusting the inverse flag of the current first block.

7. A device for processing a packet, wherein a memory is divided into a plurality of first blocks, each of the first blocks being divided into a plurality of second blocks, each of the second blocks including a first storage space and a second storage space, and the device comprises:
  a processor; and
  a module stored in a non-transitory computer readable medium executed by the processor to implement:
  obtaining a first packet to be stored,
  determining one or more second blocks to be occupied by the first packet based on a length of the first packet and a length of the first storage space,
  storing the first packet in a first storage space of each of the determined second blocks;
  for each of the determined second blocks, generating a packet descriptor (PD) corresponding to the second block, and storing the PD in a second storage space of the second block;
  determining one or more second blocks to be read based on a start address of a second packet to be read,
  for each of the determined second blocks to be read, reading a packet fragment from a first storage space of the second block to be read, and reading the PD from a second storage space of the second block to be read,
  obtaining the second packet by composing the read packet segments based on the read PDs, and sending the second packet,
  wherein reading the packet segment from the first storage space of the second block to be read, and reading the PD from the second storage space of the second block to be read comprises:
    reading the PD from the second storage space of each second block of a current first block to which the second block to be read belongs, and determining a second block corresponding to the PD in which a first flag is valid as an initial second block for storing the second packet;
    in a case that a PD in which a second flag is valid is read from the current first block,
      determining the second block corresponding to the PD in which the second flag is valid as an end second block for storing the second packet;
    in a case that no PD in which the second flag is valid is read from the current first block,
      reading the PD from the second storage space of a last second block of the current first block so as to obtain a pointer to a next first block from the PD, obtaining a number of second blocks to be occupied by the second packet in the next first block from the PD, reading PDs from the second storage spaces of the second blocks in the next first block based on the pointer and the number of second blocks, and determining the second block corresponding to the PD in which the second flag is valid in the next first block as an end second block for storing the second packet; and reading a packet fragment from the first storage space of each of the second blocks between the initial second block and the end second block.

8. The device according to claim 7, wherein the module stored in the non-transitory computer readable medium is executed by the processor to further implement:

determining a queue corresponding to the first packet;

in a case that the queue has a tail pointer, determining the second blocks to be occupied by the first packet with a start from a second block pointed by the tail pointer;

in a case that the queue does not have a tail pointer, selecting an idle first block, and determining the second blocks to be occupied by the first packet with a start from a first second block in the selected idle first block.

9. The device according to claim 7, wherein the module stored in the non-transitory computer readable medium is executed by the processor to further implement:

in a case that the second block is a first second block to be occupied by the first packet, recording the length of the first packet in the PD corresponding to the second block, and setting a first flag in the PD corresponding to the second block to be valid to indicate that the second block is the first second block for storing the first packet;

in a case that the second block is a last second block to be occupied by the first packet, setting a second flag in the PD corresponding to the second block to be valid to indicate that the second block is the last second block for storing the first packet.

10. The device according to claim 7, wherein the module stored in the non-transitory computer readable medium is executed by the processor to further implement:

in a case that the second block is a last second block of a current first block, but is not a last second block to be occupied by the first packet, recording a pointer to a next first block to be occupied by the first packet in the PD corresponding to the second block, and recording a number of the second blocks to be occupied by the first packet in the next first block in the PD corresponding to the second block.

11. The device according to claim 7, wherein the module stored in the non-transitory computer readable medium is executed by the processor to further implement:

obtaining a current inverse flag of the first block to which the second block belongs, wherein, the inverse flags for two successive uses of the first block are different; and determining that the PD corresponding to the second block includes the current inverse flag of the first block.

12. The device according to claim 7, wherein the module stored in the non-transitory computer readable medium is executed by the processor to further implement:

releasing the first storage space occupied by the read packet segment;

in a case that the first storage space of each second block in the current first block is released, retrieving the current first block as an idle first block, and releasing the second storage space of each second block in the current first block or adjust the inverse flag of the current first block.

13. A network device, comprising:

a storage unit, wherein, a memory of the storage unit is divided into a plurality of first blocks, each of the first blocks being divided into a plurality of second blocks, and each of the second blocks including a first storage space and a second storage space;

a forwarding chip, configured to obtain a first packet to be stored, determine one or more second blocks to be occupied by the first packet based on a length of the first packet and a length of the first storage space, store the first packet in a first storage space of each of the determined second blocks;

for each of the determined second blocks, generate a packet descriptor (PD) corresponding to the second block, and store the PD in a second storage space of the second block;

determine one or more second blocks to be read based on a start address of a second packet to be read, for each of the determined second blocks to be read, read a packet fragment from a first storage space of the second block to be read, and read the PD from a second storage space of the second block to be read, obtain the second packet by composing the read packet segments based on the read PDs, and send the second packet, wherein reading the packet segment from the first storage space of the second block to be read, and reading the PD from the second storage space of the second block to be read, comprises:

reading the PD from the second storage space of each second block of a current first block to which the second block to be read belongs, and determining a second block corresponding to the PD in which a first flag is valid as an initial second block for storing the second packet;

in a case that a PD in which a second flag is valid is read from the current first block, determining the second block corresponding to the PD in which the second flag is valid as an end second block for storing the second packet;

in a case that no PD in which the second flag is valid is read from the current first block, reading the PD from the second storage space of a last second block of the current first block so as to obtain a pointer to a next first block from the PD, obtaining a number of second blocks to be occupied by the second packet in the next first block from the PD, reading PDs from the second storage spaces of the second blocks in the next first block based on the pointer and the number of second blocks, and determining the second block corresponding to the PD in which the second flag is valid in the next first block as an end second block for storing the second packet; and reading a packet fragment from the first storage space of each of the second blocks between the initial second block and the end second block.

* * * * *